(12) United States Patent
Van Thiel

(10) Patent No.: US 11,491,963 B2
(45) Date of Patent: Nov. 8, 2022

(54) PARKING BRAKE VALVE DEVICE

(71) Applicant: WABCO GmbH, Hannover (DE)

(72) Inventor: Julian Van Thiel, Burgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 296 days.

(21) Appl. No.: 16/753,802

(22) PCT Filed: Aug. 24, 2018

(86) PCT No.: PCT/EP2018/072889
§ 371 (c)(1),
(2) Date: Apr. 6, 2020

(87) PCT Pub. No.: WO2019/068393
PCT Pub. Date: Apr. 11, 2019

(65) Prior Publication Data
US 2020/0247381 A1 Aug. 6, 2020

(30) Foreign Application Priority Data

Oct. 7, 2017 (DE) ...................... 10 2017 009 307.5

(51) Int. Cl.
*B60T 13/26* (2006.01)
*B60T 13/74* (2006.01)
*B60T 8/17* (2006.01)

(52) U.S. Cl.
CPC .......... *B60T 13/743* (2013.01); *B60T 8/1708* (2013.01); *B60T 13/26* (2013.01); *B60T 13/745* (2013.01)

(58) Field of Classification Search
CPC ...... B60T 13/26; B60T 13/743; B60T 13/745; B60T 8/1708
See application file for complete search history.

(56) References Cited

U.S. PATENT DOCUMENTS

2009/0309413 A1   12/2009   Bensch
2011/0012421 A1*   1/2011   Bensch ................... B60T 17/18
                                                                  701/78

(Continued)

FOREIGN PATENT DOCUMENTS

CN    106414194 A    2/2017
DE    102006034762 B3    10/2007

(Continued)

*Primary Examiner* — Vishal R Sahni
(74) *Attorney, Agent, or Firm* — Leydig, Voit & Mayer, Ltd.

(57) ABSTRACT

A parking brake valve device for controlling a spring accumulator parking brake in an electro-pneumatic brake system includes a compressed air inlet configured to connect to a compressed air supply. The parking brake valve device also includes an electro-pneumatic handbrake (EPH) valve configuration and a parking brake control outlet configured to connect a spring accumulator parking brake, and a trailer control valve (TCV) device configured to control a trailer control outlet and a trailer supply outlet for a trailer brake system. The parking brake valve device further includes a multiplex switching device connected to the compressed air inlet and having electro-pneumatic switching valves configured to be controlled via electrical control signals for selective compressed air supply and venting of the EPH valve configuration and/or the TCV device.

16 Claims, 2 Drawing Sheets

(56) References Cited

U.S. PATENT DOCUMENTS

| | | | |
|---|---|---|---|
| 2011/0147141 A1 | 6/2011 | Schnittger | |
| 2012/0319464 A1* | 12/2012 | Lloyd | B60T 17/22 |
| | | | 303/3 |
| 2016/0332608 A1 | 11/2016 | Kiel | |
| 2017/0072930 A1* | 3/2017 | Leinung | B60T 8/1708 |

FOREIGN PATENT DOCUMENTS

| | | |
|---|---|---|
| DE | 102006041010 A1 | 3/2008 |
| DE | 102008007877 B3 | 11/2009 |
| DE | 102010021911 A1 | 12/2011 |
| DE | 102011016740 A1 | 10/2012 |
| DE | 102012000435 A1 | 7/2013 |
| DE | 102012013959 A1 | 5/2014 |
| DE | 102015008377 A1 | 12/2016 |
| DE | 102015112490 A1 | 2/2017 |
| EP | 3098129 A1 | 11/2016 |
| WO | WO 2016177475 A1 | 11/2016 |

* cited by examiner

PARKING BRAKE VALVE DEVICE

CROSS REFERENCE TO RELATED APPLICATIONS

This application is a U.S. National Phase Application under 35 U.S.C. § 371 of International Application No. PCT/EP2018/072889, filed on Aug. 24, 2018, and claims benefit to German Patent Application No. DE 10 2017 009 307.5, filed on Oct. 7, 2017. The International Application was published in German on Apr. 11, 2019 as WO 2019/068393 under PCT Article 21(2).

FIELD

The invention relates to a parking brake valve device in an electro-pneumatic brake system. The parking brake valve device is provided for controlling a spring accumulator parking brake and a trailer brake system and is configured in an electro-pneumatic manner for the control procedure by way of an electronic control unit.

BACKGROUND

Electro-pneumatic brake systems are provided in particular for a vehicle that is provided as a towing vehicle for coupling to a trailer having a trailer brake system. For this purpose, a pneumatic coupling device that has for example a yellow and a red coupling head is generally provided for a trailer supply line and a trailer control line.

The spring accumulator parking brake is self-locking, i.e. is engaged in the non-pressurized or rather vented state; said spring accumulator parking brake is filled or rather ventilated via a parking brake control outlet of a parking brake valve device in order to release said spring accumulator parking brake. Electro-pneumatic hand brakes (EPH) render it possible to release and apply the spring accumulator parking brake or rather parking brake by way of electrical actuations and for safety reasons are preferably designed in a bistable manner with the result that in the de-energized state both the parked state in which the spring accumulator parking brake (parking brake) is applied and also the driving state in which the spring accumulator parking brake is released or rather ventilated are safely and reliably maintained.

Trailer brake systems are controlled via the towing vehicle and for this purpose a trailer control valve (TCV) is provided that generally controls the pneumatic coupling (e.g. yellow or red coupling head) for the trailer brake system, i.e. the trailer control line and trailer supply line. Generally, a compressed air reversal of an input pneumatic control signal occurs in the trailer control valve with the result that the trailer control valve is controlled by a pneumatic control signal that it outputs in an inverted manner to the trailer brake system; hereby it is realized inter alia that the service brakes of the trailer are braked if the towing vehicle is braked via its parking brake.

In the driving position, the spring accumulator parking brakes of the towing vehicle and the service brake of the trailer vehicle are released. In the parked position, the spring accumulator parking brake is applied, i.e. vented, and the service brake of the trailer vehicle is ventilated via the TCV.

Furthermore, a so-called trailer control position is generally provided in which the spring accumulator parking brake in the towing vehicle is applied but the service brake in the trailer is released; hereby it is possible to check whether the towing vehicle alone is able to hold the trailer with its released trailer braking system with the result that, also for example in the case of a leakage or a failure of the pneumatically controlled service brake in the trailer, the spring accumulator parking brake of the trailer alone is able to hold the trailer.

SUMMARY

In an embodiment, the present invention provides a parking brake valve device for controlling a spring accumulator parking brake in an electro-pneumatic brake system. The parking brake valve device includes a compressed air inlet configured to connect to a compressed air supply, an electro-pneumatic handbrake (EPH) valve configuration and a parking brake control outlet configured to connect a spring accumulator parking brake, and a trailer control valve (TCV) device configured to control a trailer control outlet and a trailer supply outlet for a trailer brake system. The parking brake valve device further includes a multiplex switching device connected to the compressed air inlet and having electro-pneumatic switching valves configured to be controlled via electrical control signals for selective compressed air supply and venting of the EPH valve configuration and/or the TCV device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
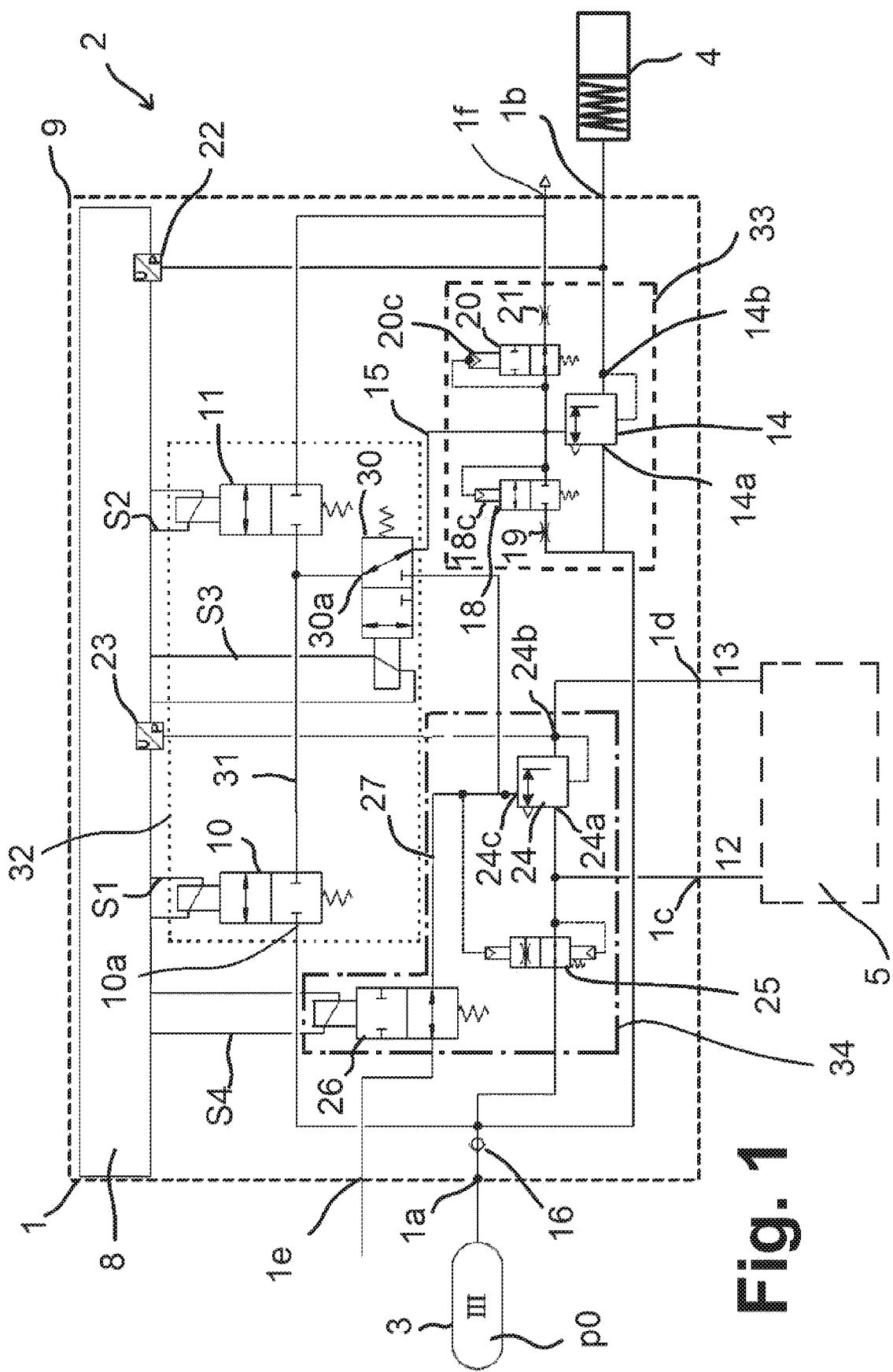
FIG. 1 illustrates an electro-pneumatic switching diagram of a control valve device in accordance with a first embodiment of the invention.

Construction of a parking brake valve device for controlling both a spring accumulator parking brake of a towing vehicle and also a trailer brake system generally requires a considerable outlay with regard to the circuit, in particular also with multiple solenoid valves (electro-pneumatic valves) that consequently require high costs and also high control currents.

The present disclosure describes parking brake valve devices that render it possible to reduce the outlay for the circuit while maintaining a high degree of safety for the dedicated brake system and the connected trailer. The present disclosure also provides electro-pneumatic brake systems having such a parking brake valve device.

The present disclosure describes controlling as one the two functions of the electronic parking brake and trailer brake controller via a multiplex switching device, in other words a multiplex procedure. The multiplex switching device is consequently connected to the compressed air inlet and preferably has electro-pneumatic switching means by way of which it is possible to control the electronic parking brake or the trailer brake system selectively. The multiplex switching device consequently renders it possible to control in a pneumatic manner two function blocks via electro-pneumatic switching means that may consequently be used for the two functions, in other words for the electronic parking brake and the trailer brake controller.

Some advantages are already realized hereby. The number of solenoid valves used may be reduced as a result of which, in particular, costs may be reduced. Furthermore, a compact construction is possible. In so doing, it is also recognized that in practice a multiplex procedure of this type has hardly any disadvantages since the electronic parking brake is generally only to be ventilated at the start of the journey and vented at the end of the journey, in other words when adopting the parked position, with the result that it is fundamentally possible to reduce the extent of the control of the electronic parking brake function. For this purpose, it is possible in particular to install a self-holding electronic parking brake valve device that consequently automatically holds its acquired state and is only controlled so as to be switched. A bistable electronic parking brake of this type is known as such. The multiplex switching device may be used during the driving operation in particular for controlling the trailer brake system.

The multiplex switching device may have in particular a control section that on the one hand is ventilated and vented via suitable inlet and outlet valve means and on the other hand is then connected to the EPH valve configuration or the TCV device via suitable switching means.

In order to control the trailer brake system, a trailer control valve device (TCV device) is preferably provided that on the one hand supplies a trailer supply line via a trailer supply outlet and on the other hand supplies a trailer control line (for initiating the trailer braking procedures) via a trailer control outlet (yellow and red coupling head). The TCV device may have in particular a trailer relay valve that is controlled via a trailer pre-control section that in turn is controlled by the multiplex switching device. Accordingly, the EPH valve configuration (electronic parking brake device) is configured with a parking brake relay valve that is preferably configured in a bistable or self-holding manner by way of suitable locking means in order to hold the respectively set position. In so doing, a parking brake pre-control section is provided for controlling the parking brake relay valve that is in turn controlled by the multiplex switching device.

Consequently, the multiplex switching device may in turn control suitable relay valves of the two function blocks with the result that the multiplex switching device itself only controls pneumatic control volumes. In so doing, all the electrical controllers or rather electro-pneumatic valves may already be provided in the multiplex switching device with the result that the two function blocks of the EPH valve configuration and the TCV device themselves are configured by way of pneumatic switching means.

In addition, an electro-pneumatic redundancy valve may be provided for the additional control of the TCV device that in turn may be controlled in addition by way of an electrical redundancy control signal. A redundancy control procedure of this type is fundamentally known.

A control valve device 1 is provided in a commercial vehicle, for example a lorry, and has a compressed air inlet 1*a* for connection to a compressed air supply 3 having a system pressure p0, furthermore said control valve device has a parking valve outlet 1*b* for connecting a spring accumulator parking brake 4 and said control valve device also has a trailer supply outlet 1*c* for connecting a pneumatic supply line 12 and has a trailer control outlet 1*d* for connecting a pneumatic control line 13 of a trailer brake system 5. Furthermore, a redundancy control inlet 1*e* is generally provided for receiving a pneumatic redundancy signal.

Consequently, the control valve device 1 has the functionality of a parking brake control valve and also of a trailer control valve, wherein these functionalities are realized in part by two provided valves. An ECU (electronic control unit) 8 is used for controlling the solenoid valves of the control valve device 1, wherein the control valve device 1 and the ECU 8 together form a control module 9, in other words may be configured as one construction unit or module in which the valves are configured in for example a common valve block and the ECU 8 is attached thereto in order to directly perform the electrical control procedures and receive the measurement signals.

The parking brake functionality is realized in particular by way of a parking brake relay valve 14 that is switched between the compressed air inlet 1*a* and the parking brake outlet 1*b*. A bypass valve configuration 18, 19, 20, 21 is used to secure the respective switching states of the relay valve 14 in a self-holding manner and is in particular provided as a protection against leakages or leakage sites, as explained below. A parking brake pressure sensor 22 is used for measuring the output pressure p-1*b* at the parking brake control output 1*b* and is read out by the ECU 8.

The trailer control functionality, in other words the function of controlling the trailer brake system 5, is formed by a trailer relay valve 24 having a relay valve inlet 24*a* and a relay valve outlet 24*b* and also a pneumatic control inlet 24*c*, wherein the trailer relay valve 24 is used in the conventional manner for boosting quantities of air; its relay valve outlet 24*b* is accordingly connected to the trailer control outlet 1*d* for the trailer brake system 5, in other words to the yellow coupling head having the trailer brake pressure line (trailer control line) 13. The red coupling head having the trailer supply line 12 is connected for example together with the relay valve inlet 24*a* to the compressed air inlet 1*a*, in this case via a cut-off valve 25, which is configured as a 2/2 directional control valve that is controlled in a double-acting pneumatic manner, is spring preloaded into an initial position and has a through-flow position and a restricting position and is explained below.

A redundancy valve 26 is configured as an electrically controlled 2/2 shut-off valve preferably having an open initial position and is connected to the redundancy control inlet 1*e* of the control valve 1; the outlet 26*b* of said redundancy valve is connected to a trailer pre-control section 27. The trailer pre-control section 27 is used for the pneumatic control of the trailer relay valve 24 and also for controlling the cut-off valve 25 and is furthermore controlled by a switching valve 30 that is provided as an electrically controlled 3/2 directional control valve and is connected via its outlet depending upon the switching position either to the trailer pre-control section 27 or to a parking brake pre-control section 15 for pre-controlling the parking brake relay valve 14.

Furthermore, an inlet valve 10 and also an outlet valve 11 are provided that are each provided as self-blocking and electrically controlled 2/2 directional control valves. The inlet valve 10, the outlet valve 11 and the switching valve 30 are used for both functions and consequently as a multiplex switching device 32 for selectively pre-controlling both the parking brake function and also the trailer control function.

The inlet valve 10 is consequently connected via its inlet 10*a* to the compressed air inlet 1*a*, generally via a non-return valve 16 on the compressed air inlet 1*a*, and via its outlet 10*a* to an adjustment section (adjustment line section) 31 to which the inlet 30a of the switching valve 30 is connected. The inlet valve 10 is controlled by the ECU 8 via a first electrical control signal S1 and where S1=1 connects the adjustment section to the compressed air inlet 1a, i.e. to the supply pressure p0. The switching valve 30 is in turn controlled via a third control signal S3 and connects the pressure p31, which is available in the adjustment section 31, depending upon its valve position to a parking brake pre-control section 15 of a parking brake switching device 33 or the trailer pre-control section 27 of a trailer control valve device 34.

In accordance with the illustrated circuit, in the initial state, in other words where S3=0, the adjustment section 31 is connected to the parking brake pre-control section 15 of the parking brake switching device 33 that has a parking brake relay valve 14, two shut-off valves 18, 20 and two restrictors 19, 21. Consequently, the adjustment section 31 controls the parking brake relay valve 14 with the result that in this parking brake control position where S3=0 it is possible to control the parking brake relay valve 14 by way of controlling the inlet valve 10 by means of S1=1 or S1=0. By virtue of controlling the outlet valve 11 by means of a second electrical control signal S2=1, the adjustment section 31 is connected to the venting connection 1f.

The bypass circuit 18, 19, 20, 21 is used so as with respect to leakages and leakage sites to maintain an adjustment pressure that is input once into the parking brake pre-control section 15, in other words the system pressure p0 of the compressed air supply 3, until the parking brake pre-control section 15 is actively vented: where S1=1 and S3=0, consequently if the parking brake pre-control section 15 is connected to the compressed air inlet 1a and is ventilated with the system pressure p0 in order to adjust the parking brake relay valve 14, the inlet bypass valve 18 is further controlled at its pneumatic control inlet 18c and consequently opened from its self-blocking initial position into the through-flow position with the result that the parking brake pre-control section 15 is also connected directly to the compressed air inlet 1a via the open inlet bypass valve 18 and the inlet restrictor 19. Even if consequently the switching valve 30 is subsequently switched by way of S3=1 and the parking brake pre-control section 15 is consequently separated from the adjustment section 31, it is connected via the open inlet bypass line directly into the compressed air inlet 1a; leakages into the lines or for example also into the inlet bypass valve 18 do not lead to a drop in pressure in the relay valve pre-control section 15 since compressed air continues to flow from the compressed air inlet 1a via the open inlet bypass valves 18 and also automatically holds the inlet bypass valve 18 open. Furthermore, the relay valve pre-control section 15 that is subjected to a system pressure p0 also holds the outlet bypass valve 20 in the flow-blocking position since it also acts on the pneumatic control inlet 20c and consequently switches the outlet bypass valve 20 into its flow-blocking position. On the other hand, it is only possible to vent the relay valve pre-control section 15 via the switching valve 30 that is located in its initial position and via the outlet valve 11, in other words by way of S3=0 and S2=1. In this non-pressurized section of the relay valve pre-control section 15, the outlet bypass valve 20 is in its open initial position and consequently safely and reliably vents the relay valve pre-control section 15 so that leakages for example via the switching valve 30 or the inlet bypass valve 18 do not lead to an unintended increase in the compressed air in the relay valve pre-control section 15.

By virtue of switching the switching valve 30, in other words where S3=1, the adjustment section 31 is connected to the trailer pre-control section 27 of the TCV device (trailer control valve device) 34 that has the trailer relay valve 24, the cut-off valve 25 and preferably a redundancy valve 26. Consequently, it is possible—according to the above description in the case of the relay valve pre-control section 15 of the parking brake switching device 33—for the adjustment section 31 to adjust the trailer relay valve 24. Depending upon the pressure value in the trailer pre-control section 27, the cut-off valve 25 connects the trailer pre-control section 27 in a restricted or non-restricted manner to the compressed air inlet 1a.

In the spring preloaded initial position, the cut-off valve 25 is open. Consequently, the system pressure p0 prevails at the inlet 24a of the trailer relay valve 24 via the compressed air inlet 1a and the non-return valve 16 with the result that the trailer relay valve 24 is adjusted depending upon the pressure value in the trailer pre-control section 27 and the system pressure prevails at the supply outlet 1d (trailer control outlet) and consequently at the trailer brake pressure line or trailer control line 13. In the event that the trailer pre-control section 27 is not filled with compressed air, the trailer relay valve 24 is not adjusted. During the procedure of filling the trailer pre-control section 27 with compressed air, the cut-off valve 25 is switched into its actuated, restricting position if the system pressure p0 is not sufficiently high at the inlet 24a. Accordingly, it is also possible in turn to vent the trailer pre-control section 27 via the switching valve 30, in other words where S3=1, and the open outlet valve 11, in other words S2=1.

A second pressure sensor 23 is provided for measuring the pressure at the supply outlet or trailer control outlet 1d.

The redundancy valve 26 is generally provided for controlling the trailer pre-control section 27 with the result that it is possible to connect a redundancy valve control inlet 1e to the trailer pre-control section 27 directly via a fourth electric control signal S4, where S4=1 or S4=0, in particular as an additional safety aspect. Fundamentally, this safety function provided by the redundancy valve control inlet 1e may also be omitted.

Consequently, it is possible by way of a common inlet valve 10 and outlet valve 11 and also the switching valve 30, in other words using only three solenoid valves, to adjust both the parking brake switching device 33 for controlling the spring accumulator parking brake 4 and also the TCV device 34, wherein in the case of the illustrated use of one redundancy a further solenoid valve is likewise used via the redundancy valve 26.

The cut-off valve 25 between the inlet 24a of the trailer relay valve 24 and the compressed air inlet 1a is used in particular so as in the event that the trailer control line 13 shears, in other words at the yellow head, to initiate a braking procedure when requested by the driver.

In the presence of a braking signal for the trailer brake system 5, the trailer pre-control section 27 is ventilated by way of S1=1 and S3=1, or in the redundancy safety case by virtue of controlling the compressed air via the redundancy inlet 1e. Consequently, the trailer relay valve 24 is adjusted and connects the trailer control line 13 to the compressed air inlet 1a, i.e. accordingly to the trailer supply line 12. In the event that the trailer control line 13 tears or forms a leakage, then the pressure drops at the inlet 24a of the trailer relay valve 24 or rather in the line region of the inlet 24a, for example said pressure drops below the pressure value of 9 bar that is prevailing in the trailer pre-control section 27. Consequently, the cut-off valve 25 is switched against its relatively low magnitude of spring preloading; the pneumatic control signal in the trailer pre-control section 27 switches the cut-off valve 25 into its actuated position with restricted through-flow with the result that the red coupling head having the trailer supply line 12 is also only connected to the compressed air inlet 1a in a restricted manner. The two lines 12, 13 consequently lose air via the leakage from the trailer control line 13 with the result that the trailer brake system 5 is braked. Consequently, when the driver requests a braking procedure, the trailer is braked even in the event that a line has sheared.

Figure 2:
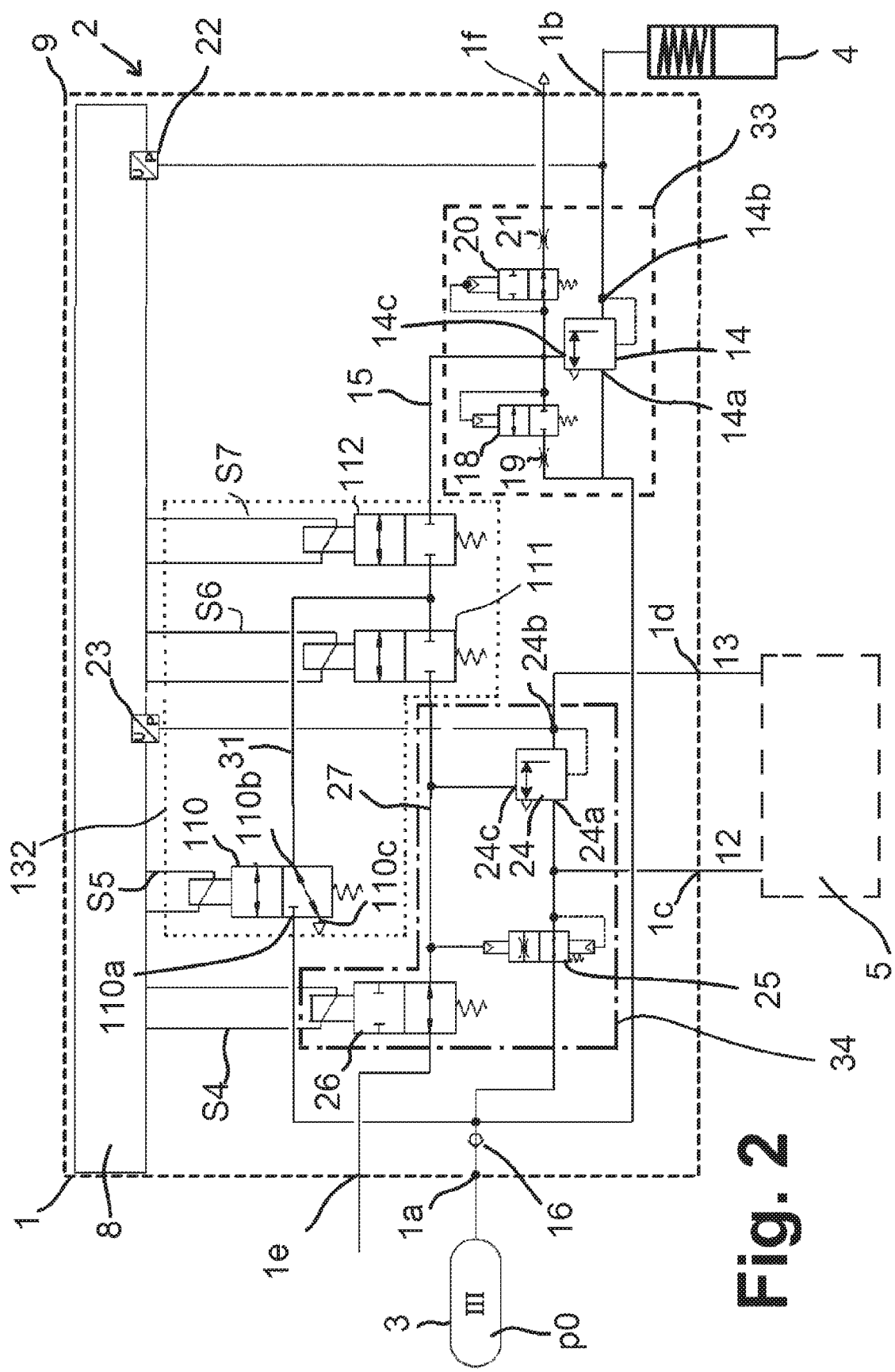
FIG. 2 illustrates an electro-pneumatic switching diagram of a control valve device in accordance with a further embodiment of the invention.

The embodiment shown in FIG. 2 illustrates an electro-pneumatic circuit, in which as in the case of the first embodiment shown in FIG. 1 the connections 1a, 1b, 1c are provided,
the TCV device 34 having its valves 24, 25, 26 is connected to the outlets 1c and 1d and a redundancy control procedure is possible via the fourth electrical control signal S4,
as shown in FIG. 1, a parking brake circuit configuration 33 having the valves 14, 18, 20 and the restrictors 19, 21 is provided,
a multiplex switching device 132 is connected upstream of the two devices 33, 34, however said multiplex switching device has a different solenoid valve configuration: the adjustment section 31 in FIG. 2 is ventilated and vented via an inlet and outlet valve 110 that is configured as a 3/2 directional-control solenoid valve and is controlled by means of a fifth electrical control signal S5, wherein the adjustment section 31 is vented in the illustrated initial position where S5=0 and ventilated where S5=1.

The adjustment section 31 is connected by way of two self-blocking solenoid shutoff valves 111, 112 then respectively to the trailer pre-control section 27 or the parking brake pre-control section 15. In so doing, a trailer control valve 111 is controlled by means of a trailer control signal (sixth electrical control signal) S6 and a parking brake control valve 112 is controlled by means of a parking brake control signal (seventh electrical control signal). In the case of this embodiment, a common adjustment section 31 is consequently also provided for the two functions. The pre-control sections 15, 27 may be controlled in this embodiment simultaneously or separately by way of the electrical control signals S6 and S7 since it is also possible to simultaneously connect the pre-control sections 27, 15 to the adjustment section 31 where S6=S7=1.

In the event that for example the parking brake pre-control section 15 is to be ventilated where S7=1 and S5=0, it is possible where S6=0 to separate the trailer pre-control section 27 from the adjustment section 31 and selectively ventilate the further provided redundancy control signal S4, in other words a compressed air supply is ensured where S4=0. In the event that a procedure of venting the trailer pre-control section 27 is also provided, S4=1 and S6=1 are also selected in this situation where S1=0 and S7=1.

In other respects, the functions of the valves of the embodiment shown in FIG. 2 correspond to those in FIG. 1, in particular also the pressure sensors 22, 23, the bypass valves 18, 20, the restrictors 19, 21 and the cut-off valve 25.

Consequently, in the case of the two embodiments, a multiplex switching device 32, 132 is provided that ventilates and vents an adjustment section 31 and selectively connects to the devices 33, 34. In the case of the embodiment shown in FIG. 2, it is possible to connect the adjustment section 31 to the two devices 33, 34 simultaneously or rather in a parallel manner. Fundamentally, the embodiments shown in FIG. 1, 2 may be combined, for example with the switching valve 30 and inlet and outlet valve 110 with the result that then only two electrical control signals S3, S5 are required.

The control valve device 1, the compressed air supply 3, the spring accumulator parking brake 4 and the trailer brake system 5 form an electro-pneumatic brake system 2 that is consequently cost effective and efficient.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Control valve device
1a Compressed air inlet
1b Parking brake control outlet
1c Trailer supply outlet, compressed air outlet
1d Trailer control outlet
1e Control inlet
1f Venting connection
2 Electro-pneumatic brake system
3 Compressed air supply
4 Spring accumulator parking brake
5 Trailer brake system
8 ECU (electronic control unit)
9 Control module
10 Inlet valve
10a Inlet of the inlet valve 10
11 Outlet valve
12 Trailer supply line, pneumatic supply line
13 Trailer brake pressure line, trailer control line
14 Parking brake relay valve
15 Parking brake pre-control section
16 Non-return valve
18 Inlet bypass valve
18c Pneumatic control inlet of the inlet bypass valve 18
19 Inlet restrictor
20 Outlet bypass valve
20c Pneumatic control inlet of the outlet bypass valve 20
21 Outlet restrictor
18, 19, 20, 21 Bypass valve configuration
22 First pressure sensor 23 Second pressure sensor
24 Trailer relay valve
24a Inlet of the trailer relay valve
24b Outlet of the trailer relay valve
24c Pneumatic control inlet of the trailer relay valve
25 Cut-off valve
26 Redundancy valve
27 Trailer pre-control section
30 Switching valve
30a Inlet of the switching valve
31 Adjustment section
32 Multiplex switching device shown in FIG. 1
132 Multiplex switching device shown in FIG. 2
33 EPH valve configuration 14, 18, 19, 20, 21
34 TCV device, trailer control valve device, 24, 25, 26
110 Inlet and outlet valve
110a Inlet of the inlet and outlet valve 110
110b Outlet of the inlet and outlet valve 110
110c Venting of the inlet and outlet valve 110
111 Trailer control valve
112 Parking brake control valve
p-1b Output pressure
p0 System pressure
S1 First electrical control signal
S2 Second electrical control signal
S3 Third electrical control signal
S4 Fourth electrical control signal
S5 Fifth electrical control signal
S6 Trailer control signal sixth electrical control signal
S7 Parking brake control signal, seventh electrical control signal

The invention claimed is:

1. A parking brake valve device for controlling a spring accumulator parking brake in an electro-pneumatic brake system, the parking brake valve device comprising:
a compressed air inlet configured to connect to a compressed air supply;
an electro-pneumatic handbrake (EPH) valve configuration and a parking brake control outlet configured to connect the spring accumulator parking brake;
a trailer control valve (TCV) device configured to control a trailer control outlet and a trailer supply outlet for a trailer brake system; and
a multiplex switching device connected to the compressed air inlet and having electro-pneumatic switching valves configured to be controlled via electrical control signals for selective compressed air supply and venting of the EPH valve configuration and/or the TCV device, one or more of the electro-pneumatic switching valves being configured as an electro-pneumatic switching apparatus, wherein:
the multiplex switching device has an adjustment section configured to be connected to the compressed air inlet and to a venting connection via at least one of the electro-pneumatic switching valves that is not configured as the electro-pneumatic switching apparatus by virtue of a control procedure involving at least one of the electrical control signals, and
the adjustment section is configured to be connected to the EPH valve configuration and/or the TCV device via the electro-pneumatic switching apparatus, the electro-pneumatic switching apparatus being arranged between the adjustment section and the EPH valve configuration and/or the TCV device and being configured to selectively connect the adjustment section to the EPH valve configuration or the TCV device.

2. The parking brake valve device as claimed in claim 1, wherein the adjustment section is configured to be connected via an electro-pneumatic 3/2 directional control valve either to the compressed air inlet or to the venting connection.

3. The parking brake valve device as claimed in claim 1, wherein the adjustment section is configured to be connected to the compressed air inlet or disconnected therefrom via an inlet valve, and wherein the adjustment section is further configured to be connected to the venting connection or disconnected therefrom via an outlet valve.

4. The parking brake valve device as claimed in claim 1, wherein an electrically controlled 3/2 switching valve is provided as the switching apparatus, which connects the adjustment section either to the EPH valve configuration or to the TCV device.

5. The parking brake valve device as claimed in claim 1 wherein that the switching apparatus includes two shutoff valves by way of which the EPH valve configuration and/or the TCV device are/is configured to be connected to the adjustment section.

6. The parking brake valve device as claimed in claim 1, wherein the EPH valve configuration has a relay valve and a relay valve pre-control section configured to control the relay valve,
wherein it is possible to control the relay valve pre-control section by the multiplex switching device, and
wherein the parking brake control outlet is configured to be connected to the compressed air inlet by the parking brake relay valve.

7. The parking brake valve device as claimed in claim 6, wherein a bypass circuit is connected to the relay valve pre-control section so as to automatically maintain a pressure state of the relay valve pre-control section.

8. The parking brake valve device as claimed in claim 7, wherein when the adjustment switching pressure is sufficient such that the bypass circuit automatically connects the relay valve pre-control section and the pneumatic control inlet of the relay valve connected thereto to the compressed air inlet and/or to the relay valve inlet and holds the relay valve pre-control section and pneumatic control inlet in the connected position until the relay valve pre-control section is actively vented.

9. The parking brake valve device as claimed in claim 8, wherein when the adjustment switching pressure is sufficient such that the bypass circuit automatically connects the relay valve pre-control section and the pneumatic control inlet of the relay valve connected thereto to the compressed air inlet and/or to the relay valve inlet.

10. The parking brake valve device as claimed in claim 7, wherein in the vented state, the relay valve pre-control section is automatically held in the vented state by way of the bypass circuit, in that the bypass circuit connects the relay valve pre-control section to a venting connection.

11. The parking brake valve device as claimed in claim 7, wherein the relay valve pre-control section is connected by the bypass circuit to the compressed air inlet or to the venting connection respectively via a restrictor and a pneumatically controlled shutoff valve, so as to compensate for smaller air flows, in particular leakage flows, and
wherein at least one of the shutoff valves is open so as to connect the relay valve pre-control section to the compressed air inlet and/or to the venting connection.

12. The parking brake valve device as claimed in claim 11, wherein respectively only one of the shutoff valves is open so as to connect the relay valve pre-control section to either the compressed air inlet or to the venting connection, and the other shutoff valve is closed.

13. The parking brake valve device as claimed in claim 1, wherein the TCV device has a trailer relay valve that is switched between the compressed air inlet and the trailer control outlet and may be controlled by way of a trailer pre-control section that is connected to the multiplex switching device.

14. The parking brake valve device as claimed in claim 13, wherein the TCV device has a cut-off valve that is switched between the compressed air inlet and the trailer supply outlet and the trailer relay valve, wherein the cut-off valve is open in its initial position and in dependence upon a pressure difference between the trailer pre-control section and the trailer supply outlet may be switched between an open and a closed position so as to restrict the compressed air supply from the compressed air inlet to the trailer supply outlet when the pressure in the trailer supply outlet is less than the trailer pre-control section.

15. The parking brake valve device as claimed in claim 13, wherein that the TCV device has a redundancy valve configured to be switched between a flow-blocking position and an open position and has an electrical control device, so as to connect the trailer pre-control section to a redundancy inlet of the parking brake valve device for a redundant control procedure of the trailer relay valve.

16. An electro-pneumatic brake system, comprising:
a parking brake valve device as claimed in claim 1;
a compressed air supply connected to the compressed air inlet;
a spring accumulator parking brake connected to the parking brake outlet;
a trailer brake system connected to the trailer control outlet and to the trailer supply outlet; and
an electronic control unit configured to output the electrical control signals for the pneumatic control of the spring accumulator parking brake and of the trailer brake system.

* * * * *